Sept. 11, 1962  C. B. STAIR  3,053,348
REGULATOR FOR VEHICLE BRAKES
Filed Sept. 14, 1959  2 Sheets-Sheet 1
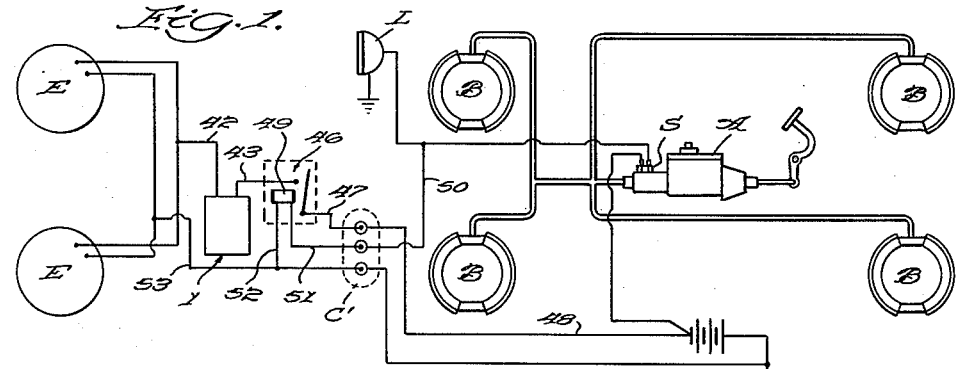
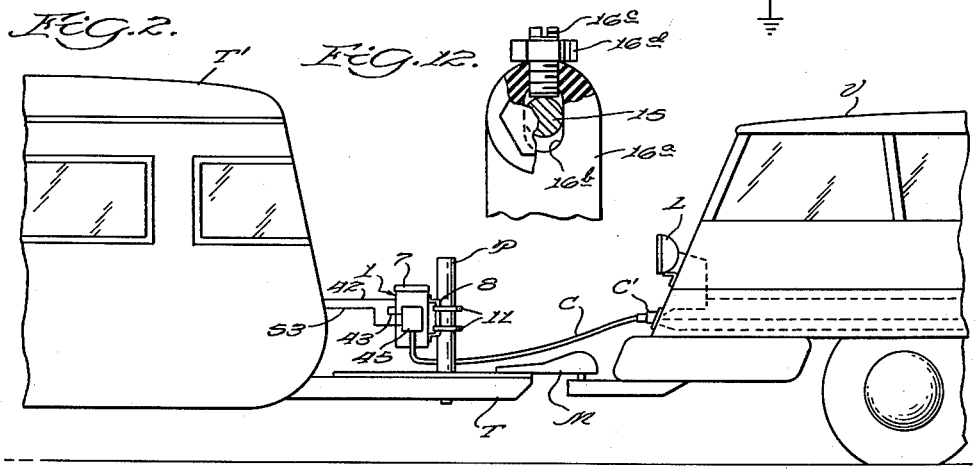
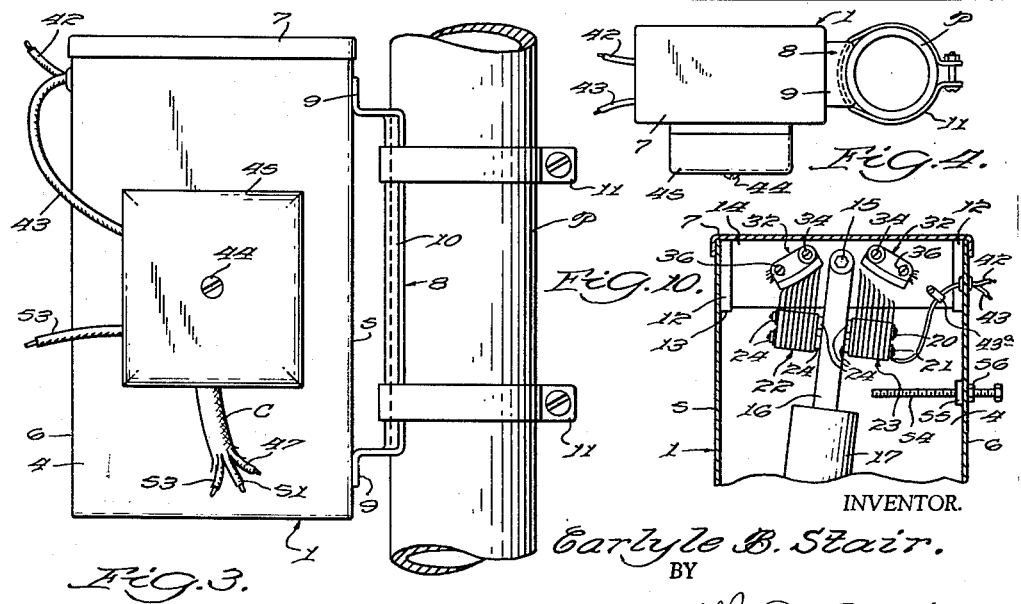
INVENTOR.
Carlyle B. Stair.
BY
Harold J. DeVesconte
Atty.

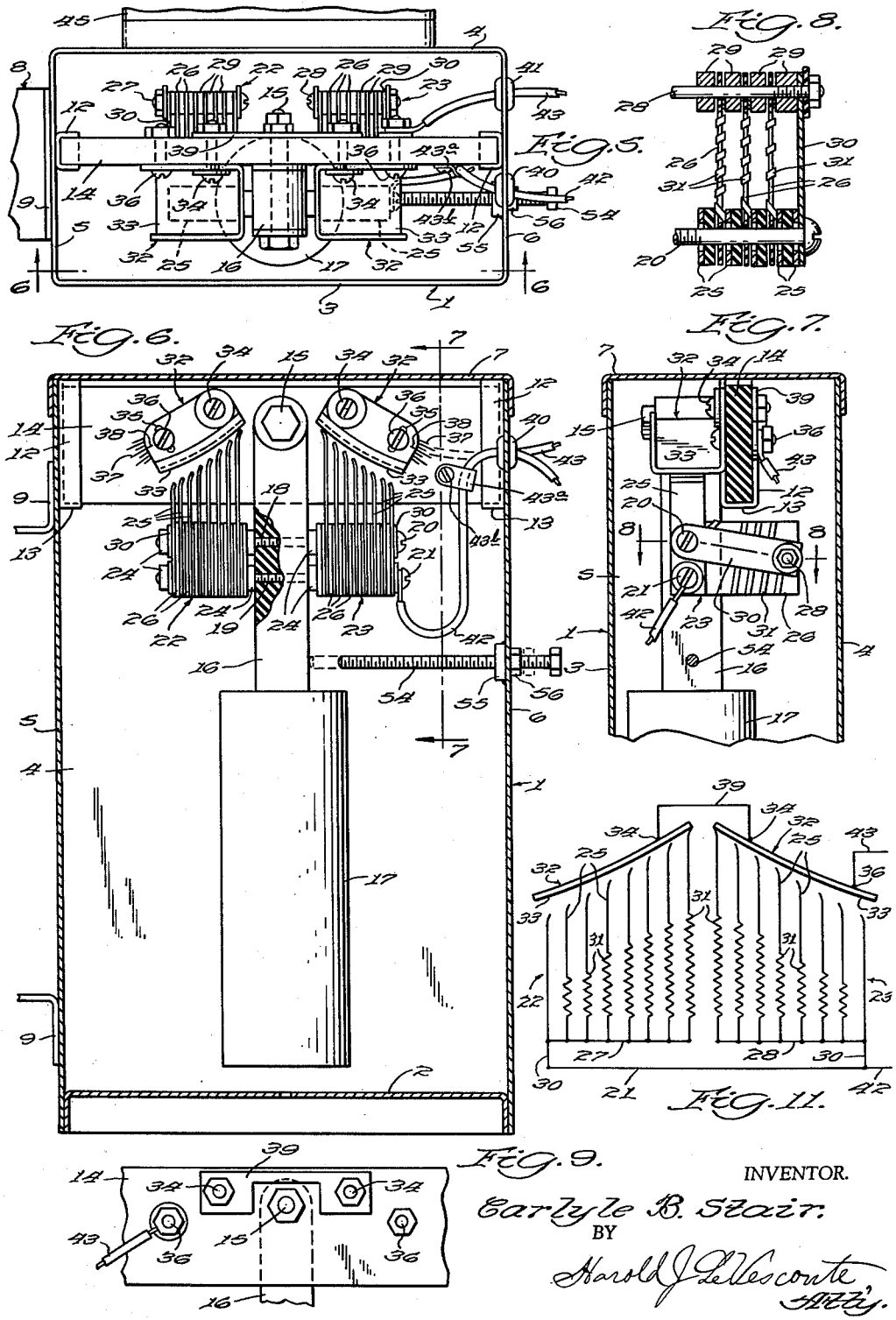

United States Patent Office 3,053,348
Patented Sept. 11, 1962

3,053,348
REGULATOR FOR VEHICLE BRAKES
Carlyle B. Stair, 3109 Buckingham Road,
Glendale 6, Calif.
Filed Sept. 14, 1959, Ser. No. 839,834
20 Claims. (Cl. 188—112)

This invention relates to vehicle braking devices and more particularly to an operating and controlling means for the brakes of a towed vehicle.

The principal object of the invention is to provide a trailer brake operating and brake application regulating means which can be controlled by energization of the stop light circuit of the towing vehicle.

Another object of the invention is to provide a variable resistance means for electrically operated brakes on a trailer which, when energized, is responsive both to deceleration forces deriving from manually initiated trailer brake application and to the grade of the road over which the trailer is being towed.

A further object of the invention is to provide a variable resistance means for electrically operated brakes on a trailer in which the supply of energizing current applied to the brakes is proportional to the deceleration rate deriving either from manually initiated trailer brake application or to the angle of the grade on which the trailer is being towed.

Still another object of the invention is to provide a regulating means for manually controlled, electrically operated brakes of trailers in which the foregoing objectives are realized in practice, which is simple in construction, reliable in operation and which is capable of being readily installed on existing trailers equipped with electrically operated brakes as well as incident to the manufacture of such trailers.

With the foregoing objects in view, together with such additional objects and advantages as may subsequently appear, the invention resides in the parts, and in the construction, combination and arrangement of parts described, by way of example, in the following specification of a presently preferred embodiment of the invention, reference being had to the accompanying drawings which form a part of said specification and in which drawings:

FIG. 1 is a schematic drawing showing the braking systems of a towing vehicle and trailer in which the trailer is equipped with electrically operated brakes and in which the present invention is incorporated, FIG. 2 is a side elevational view of the coupled portions of a towing vehicle and trailer showing the actuating connection between them and the mounting of the control and operating means for the trailer brakes, FIG. 3 is an enlarged side elevational view of the exterior of the device and showing particularly a representative mode of mounting it on the trailer, FIG. 4 is a reduced scale top plan view of FIG. 3, FIG. 5 is an enlarged top plan view of the device with the cover plate of the casing removed, FIG. 6 is a side elevational view taken on the line 6—6 of FIG. 5, other parts being broken away for clearness of illustration, FIG. 7 is a fragmentary sectional view taken on the line 7—7 of FIG. 6, FIG. 8 is a fragmentary sectional plan view taken on the line 8—8 of FIG. 7, FIG. 9 is a fragmentary side elevational view of the variable resistance control means base as viewed from the side opposite that shown in FIG. 6, FIG. 10 is a side elevational view in reduced scale similar to FIG. 6 and showing the nature of response of the variable resistance device to deceleration, FIG. 11 is a circuit diagram of the variable resistance means employed in the present invention, and FIG. 12 is an enlarged fragmentary view of an alternative form of mounting for the pendulum arm of the device.

Referring first to FIG. 1, there is shown a towing vehicle hydraulic braking system comprising a pedal operated master cylinder A operatively connected to the vehicle brakes B and, through a switch S, lighting a stop light L. Additionally, there is represented the electrically operated brakes E of a trailer which through means constituting the present invention and energized by the stop light circuit are actuated and released.

Referring to FIG. 2, there is shown a towing vehicle V connected by a coupling means M to the tongue T of a trailer T', said tongue having a vertical cylindrical post P rising therefrom in which the jack by which the trailer is maintained in level position when disconnected from a towing vehicle is housed. An electric cable C including a plural circuit plug and socket means C' connects the trailer brake system with the energy source in the towing vehicle.

The control means is mounted within a vertically elongated rectangular case 1 of greater length than width and of greater width than thickness mounted on the trailer. The case comprises a bottom member 2, side portions 3 and 4, end portions 5 and 6 and a removable cover 7. The case is mounted on the trailer with the length thereof disposed vertically when the trailer is in horizontal position and with the thickness dimension between the sides 3 and 4 disposed parallel to the axis of the trailer wheels. A convenient mounting is illustrated and comprises a stirrup-like bracket 8 having the foot portions 9, 9 thereof secured to the case and portion 5 and having the mid portion 10 concavely shaped to engage the outer surface of the post P and being clamped thereto by band clamps 11, 11.

The inner faces of the case end portions 5 and 6 at the upper ends thereof are provided with short, oppositely vertically disposed channel members 12, 12 having the lower ends thereof closed by wall portions 13, 13 to form receiving sockets for the opposite ends of the main frame member 14 of the variable resistance control mechanism; said member comprising a bar of rigid, electrically non-conductive material extending horizontally between the sockets. At its mid-length, the frame member 14 carries a transversely extending bolt 15 on which the upper end of a pendulum arm 16 is freely, pivotally mounted at the side of the member 14 which is adjacent to the case side wall 3. The pendulum arm 16 is likewise formed of rigid, non-conductive material and at its lower end carries a heavy weight or mass 17. About midway between the pivotal mounting on the bolt 15 and the upper end of the mass 17, the arm 16 is provided with a pair of holes 18 and 19 extending therethrough parallel to each other and disposed in a plane substantially in the center of the arm 16 and normal to the axis of the bolt 15. Bolts 20 and 21 extend through the holes 18 and 19, respectively, and through reversely identical multiple contact, variable resistance assemblies 22 and 23 and serve both to mount said assemblies on the pendulum arm and to electrically interconnect the two assemblies; nuts 24 serving to clamp the elements of the assemblies together and to the arm 16.

These assemblies, individually, are available for purchase as units, are identical and are merely mounted in opposite relation to each other. Each assembly consists of a plurality of flat, vertically disposed resilient metal blades 25 through the lower end of which the bolts 20 and 21 extend and the upper ends of the blades extend gradually in increasing length as they approach the pendulum bar 16. The distal end of each blade is slightly bent toward the pendulum bar. All of the blades except the outermost one are insulated from the bolts 20 and 21 and all of them are insulated from each other. A portion of the insulating means between adjacent blades comprises non-conductive, thin, rigid plates 26 through one end of which the bolts 20 and 21 extend and the opposite ends of said plates are disposed laterally of the blades and adjacent to the side wall 4 of the case. These plates at their distal ends are connected by bolts 27 and 28 extending therethrough and are held in the same spaced relation as the blades by metallic spacers 29. Externally of the outermost blade, a bar 30 extends between the bolts 20 and 28 and the plates 26 extending from the bolt 28 to the bolts 20 and 21 carry resistant wires 31 wound thereon; the numbers of turns of resistance wires increasing as these blades approach the center or the longer ones of said blades and the ends of the resistance wires are clamped at one end between the side of the plate on which it is wound and the metallic spacer adjacent thereto and at the other end between the side of the plate and the blades to which the resistant wire conducts current; the tightening of the bolts serving to effect the necessary electrical connection therebetween.

Mounted on the side of the switch frame member 14 above the free ends of the contact blades are metallic contact shoes 32, 32 having curved contact spaces 33, 33 disposed substantially equally slightly outwardly divergently with respect to the planes of the ends of the blades of the respective assemblies when the pendulum is in repose as best shown in FIG. 6. Bolts 34, 34 secure the inner ends of the contact shoes to the frame member 14 and the shoes are adjustable radially about the axes of the bolts 34, 34, the outer ends of each shoe being provided with a slot 35 through which a clamp bolt 36 extends. The adjacent surface of the frame member may be provided with graduation marks 37 with which a line 38 on the shoe registers to determine the extent of adjustment of the shoe. On the opposite face of the frame member 14, a bus bar member 39 interconnects the bolts 34, 34.

The upper portion of the end wall 6 is provided with a pair of grommet lined openings 40 and 41. A lead 42 extends through the grommet 40 and is connected to the end of the bolt 21 adjacent to that end of the case. A second lead 43 extends through the grommet 41 and is connected to the end of the bolt 36 nearest the said end of the case and preferably to the end of the bolt which is adjacent the side 4 of the case. Within the case, the lead is clamped against the member 14 by a clamp 43a and screw 43b to prevent any interference with pendulum action by tension on the lead 43. Mounted on the case side wall 4 by a screw 44 is a box like cover 45 housing a relay 46. The lead 43 extends to one side of the relay armature actuated contact and the lead 42 extends to one side of the energizing coils of the wheel brakes. A lead 47 extends from the opposite side of the relay contact through the cable C and the plug connection C' and connects with a line 48 directly connected to the battery or other source of energy in the towing vehicle. The relay is actuated by a solenoid coil 49 in a circuit including a lead 50 connecting with the stop light actuating circuit of the towing vehicle and which connects through the plug C' with a lead 51 extending to one side of said coil. A lead 52 connects the opposite side of said solenoid coil with the lead 53 extending from the trailer brakes into the relay housing and thence through the cable C and plug connection C' to a ground connection on the towing vehicle.

In installation, care is taken to see that the stop light switch of the towing vehicle is so adjusted as to close the stop light circuit before the towing vehicle brakes are applied. The variable resistance control device on the trailer is adjusted so that at least the longer or inner blade of each assembly is in contact with the shoes 32, 32 when the trailer is in level position. If the trailer is tilted upwardly or downwardly, the pendulum will insure that at least one set of blades will remain in contact with the associated contact shoe. When the stop light switch is energized, the relay 46 is also energized to close the contacts thereof and current will pass through the leads 48, 47 and 43 to the variable resistance means and dependent on whether one or both sets of the blades are in contact with the contact shoes will either go directly to the assembly 23 or through the bus bar 39 to the assembly 22. If only the longer blade or blades is in contact with the contact shoes, the amount of current flowing will be reduced by the increased number of turns of the resistance wires 31 associated therewith and consequently there will be a lesser application of the trailer brakes. The point to be observed here is that the trailer brakes are applied slightly before the vehicle brakes are applied and thus when the towing vehicle brakes are applied, the trailer brakes being first applied will put the coupling means M under tension instead of under compression and thus will prevent jackknifing between the trailer and the towing vehicle. It is intended that even when applied at minimum force, the braking effort on the trailer is sufficient to bring the towing vehicle to a stop in the absence of any power being applied to the wheels thereof.

The instant however that the trailer brakes are applied with the resultant deceleration of the trailer, the effect will be to move the pendulum toward the forward end or in a clockwise direction about the pivot bolt 15 as illustrated in FIG. 10. Dependent upon which of the contact blades having the least resistance is brought into contact with the contact shoe thus interengaged, the amount of current flowing to the trailer brakes is thus increased in a predetermined amount to the rate of deceleration. If the trailer is moving at a relatively slow rate of speed and the brakes are applied, there will be a lesser application of the brakes while if the trailer is moving at a higher rate of speed, the effect may be that shown in FIG. 10 in which the outermost one of the contact blades 25 of the unit 22 is in contact with the shoe 32 in which situation there is no interposed resistance and the full effect of the available current is applied to the trailer brakes. It will be noted, of course, that this occurs only in the event that the towing vehicle brakes are applied or started to be applied sufficiently to energize the stop light circuit. It will be noted also that the adjustment of the initial engagement between the spring blades 25 and the contact shoes serves as a damping means to normally hold the pendulum in a neutral position.

The arrangement whereby the stop light switch on the towing vehicle is closed before the vehicle brakes are applied has another useful function in connection with controlling the trailer brakes. In going down a grade, the pendulum will try to remain in a vertical position while the case itself is tilted forwardly resulting in increased contact between the assembly 23 and the associated contact shoe 32. Under those conditions merely touching the towing vehicle brake pedal sufficiently to actuate the stop light circuit without applying the hydraulic brakes of the vehicle results in the application of moderate braking pressure on the trailer wheels and thus places the coupling means M under tension while the two vehicles are descending a grade. The action of the device in response to deceleration is, of course, proportional to the rate of deceleration and will operate whether the vehicles are moving forwardly or backing up. The instant there is a change in the rate of movement, the pendulum will respond and if there is current flowing through the braking circuit by reason of closing of the relay contacts, the brakes will be applied proportionately to the change of rate. It will also be evident that when the vehicles are standing still, if the stop light switch is actuated or the service brakes of the towing vehicle are actually applied with instant energization of the stop light circuit, the trailer brakes will also be applied since the variable resistance means above described is always in position to conduct at least some current to the vehicle brakes.

While the device as above described is useful both to apply the brakes in response to either forward or rearward acceleration, and to either downgrade or upgrade inclined position of the trailer, some users may prefer to employ the device arranged to respond only to forward deceleration and downgrade braking response. To that end, a stop means may be provided to limit movement of the weight in response to such conditions.

A suitable stop means for such use may be, for example, the stop screw 54 which extends through the end wall 6 of the case 1 and threadedly extends through a block 55 carried by the said wall and is secured in adjusted position by a lock nut 56. The screw 54 is positioned to engage the side of the bar 16 above the top end of the weight 17 and is sufficiently long to hold the weight in maximum resistance position, the longer spring blade or blades of the unit 22 serving to normally hold the bar yieldingly against the screw when it is adjusted to the position indicated by dotted lines.

Under such adjustment, the unit 23 may be at least disabled or may be completely omitted from the assembly of the variable resistance means since with the screw 54 adjusted as shown in full lines, the device is arranged for response to deceleration in both directions as well as to the need for downgrade braking and upgrade hill holding action. The adjustment of the screw 54, additionally will afford adjustment to determine the extent of maximum resistance of the variable resistance means.

Referring finally to FIG. 12, there is shown an alternative mounting for the pendulum arm including an adjustment thereof transverse to the axis of its movement which may be employed in place of the separate adjustment of the two contact shoes. In this modification, the pendulum arm 16a is provided with an oval bore 16b through which the bolt 15 extends, said bore having the major diameter extending parallel to the length of the arm and having a width or minor diameter closely fitting the body of the bolt. A setscrew 16c extends through the top of the arm and adjustably engages the top of the bolt and is secured in adjusted position by a locknut 16d. By adjustment of this screw, the extent of initial contact of the blades 25 with the contact shoes can be varied to suit a specific installation, it being understood that with this adjustment, the contact shoes would be fixed in their relation on the frame member 14 and would not be adjustably mounted thereon.

While in the foregoing specification, there has been described a presently preferred embodiment of the invention, the invention is not to be deemed to be limited to the precise embodiment thus disclosed by way of example, and it will be understood that the invention includes as well all such changes and modifications in the parts and in the construction, combination and arrangement of parts as shall come within the purview of the appended claims.

I claim:

1. In a regulator for electrically energized brakes of a vehicle having manually operable means for the initial energization thereof, a supporting means adapted to be fixedly mounted on the vehicle, a weight, means mounting said weight on said supporting means with capacity for reciprocatory movement relative to said supporting means in a substantially horizontal path extending longitudinally of the vehicle, resilient means interposed between said supporting means and a member movable incident to said reciprocatory movement normally operative to cause said weight to occupy a predetermined position intermediate the ends of said path and forming a component part of a variable electrical resistance means interposed in an electrical circuit extending between the vehicle brakes and a source of electrical energy employed for brake energization; said variable resistance means including a stationary component and a second component electrically conductively engaging said first component and mounted for movement relative thereto with resultant variation in the resistance imposed on said brake energizing circuit, and devices connecting said second component to said weight for movement with said weight; said variable resistance means being so arranged as to progressively decrease the resistance imposed on said brake energizing circuit as said weight is caused to be moved along said path from said normally occupied position in a predetermined proportionate response to the rate of vehicle deriving from manually initiated brake energization.

2. In a regulator for electrically energized brakes of a vehicle, a supporting means adapted to be fixedly mounted on the vehicle, a weight, means mounting said weight on said supporting means with capacity for reciprocatory movement relative to said supporting means in a substantially horizontal path extending longitudinally of the vehicle, resilient means interposed between said supporting means and a member movable incident to said reciprocatory movement normally operative to cause said weight to occupy a predetermined position intermediate the ends of said path and forming a component part of a variable electrical resistance means interposed in an electrical circuit extending between the vehicle brakes and a source of electrical energy employed for brake energization; said variable resistance means including a stationary component and a second component electrically conductively engaging said first component and mounted for movement relative thereto with resultant variation in the resistance imposed on said brake energizing circuit, manually operable switch means for opening and closing said circuit, and devices connecting said second component to said weight for movement with said weight; said variable resistance means being so arranged to progressively decrease the resistance imposed on said brake energizing circuit as said weight is caused to be moved along said path from said normally occupied position in a predetermined proportionate response to the rate of vehicle deceleration deriving from manually initiated brake energization.

3. In a regulator for electrically energized brakes of a vehicle having manually operable means for the initial energization thereof, a supporting means adapted to be fixedly mounted on the vehicle, a weight, means mounting said weight on said supporting means with capacity for reciprocatory movement relative to said supporting means in a substantially horizontal path extending longitudinally of the vehicle, resilient means interposed between said supporting means and a member movable incident to said reciprocatory movement normally operative to cause said weight to occupy a predetermined position intermediate the ends of said path and forming a component part of a variable electrical resistance means interposed in an electrical circuit extending between the vehicle brakes and a source of electrical energy employed for brake energization; said variable resistance means including a stationary component and a second component electrically conductively engaging said first component and mounted for movement relative thereto with resultant variation in the resistance imposed on said brake energizing circuit, and devices connecting said second component to said weight for movement with said weight; said variable resistance means being so arranged as to progressively decrease the resistance imposed on said brake energizing circuit as said weight is caused to be moved along said path from said normally occupied position in a predetermined proportionate response to the rate of vehicle deceleration deriving from manually initiated brake energization; the magnitude of said weight being sufficient in response to deceleraton of the vehicle to partially overcome the bias imposed thereon by said resilient means and move from its said normally occupied position, and said resilient means being effective to progressively increase the opposition thereof to movement of said weight in a predetermined relation to the extent of movement of said weight from said normally occupied position.

4. In a regulator for electrically energized brakes of a vehicle having manually operable means for the initial energization thereof, a supporting means adapted to be fixedly mounted on the vehicle, a weight, means mounting said weight on said supporting means with capacity for reciprocatory movement relative to said supporting means in a substantially horizontal path extending longitudinally of the vehicle, resilient means interposed between said supporting means and a member movable incident to said reciprocatory movement normally operative to cause said weight to occupy a predetermined position intermediate the ends of said path and forming a component part of a variable electrical resistance means interposed in an electrical circuit extending between the vehicle brakes and a source of electrical energy employed for brake energization; said variable resistance means including a stationary component and a second component electrically conductively engaging said first component and mounted for movement relative thereto with resultant variation in the resistance imposed on said brake energizing circuit, and devices connecting said second component to said weight for movement with said weight; said variable resistance means being constructed to progressively decrease the resistance imposed on said brake energizing circuit as said weight is caused to be moved along said path from said normally occupied position in a predetermined proportionate response to the rate of vehicle deceleration deriving from manually initiated brake energization; said weight being mounted on said supporting means in the manner of a pendulum and the magnitude of said weight relative to the bias of said resilient means additionally being sufficient by its response to the force of gravity in the event of the vehicle being positioned in an inclined position, as on a grade, to partially overcome the bias imposed thereon by said resilient means and move from its said normally occupied position, and said resilient means being effective to progressively increase the opposition thereof to movement of said weight in a predetermined relation to the extent of movement of said weight from said normally occupied position resulting from the inclined position of the trailer.

5. In a regulator for electrically energized brakes of a vehicle having manually operable means for the initial energization thereof, a supporting means adapted to be fixedly mounted on the vehicle, a weight, means mounting said weight on said supporting means with capacity for reciprocatory movement relative to said supporting means in a substantially horizontal path extending longitudinally of the vehicle, resilient means interposed between said supporting means and a member movable incident to said reciprocatory movement normally operative to cause said weight to occupy a predetermined position intermediate the ends of said path, a variable electrical resistance means interposed in an electrical circuit extending between the vehicle brakes and a source of electrical energy employed for brake energization; said variable resistance means including a stationary component and a second component electrically conductively engaging said first component and mounted for movement relative thereto with resultant variation in the resistance imposed on said brake energizing circuit, manually operable switch means for opening and closing said brake energizing circuit, and devices connecting said second component to said weight for movement with said weight; said variable resistance means being so constructed as to progressively decrease the resistance imposed on said brake energizing circuit as said weight is caused to be moved along said path from said normally occupied position in a predetermined proportionate response to the rate of vehicle deceleration deriving from manually initiated brake energization; the magnitude of said weight relative to the bias of said resilient means being sufficient in response to deceleration of the vehicle to partially overcome the bias imposed thereon by resilient means and move from its said normally occupied position, and said resilient means, additionally being effective to progressively increase the opposition thereof to movement of said weight in a predetermined relation to the extent of movement of said weight from said normally occupied position resulting from an inclined position of the trailer.

6. In a regulator for electrically energized brakes of a vehicle, a supporting means adapted to be fixedly mounted on the vehicle, a weight, means mounting said weight on said supporting means with capacity for reciprocatory movement relative to said supporting means in a substantially horizontal path extending longitudinally of the vehicle, resilient means interposed between said supporting means and a member movable incident to said reciprocatory movement normally operative to cause said weight to occupy a predetermined position intermediate the ends of said path and forming a component part of a variable electrical resistance means interposed in an electrical circuit extending between the vehicle brakes and a source of electrical energy employed for brake energization; said variable resistance means including a stationary component and a second component electrically conductively engaging said first component and mounted for movement relative thereto with resultant variation in the resistance imposed on said brake energizing circuit, manually operable switch means for opening and closing said brake energizing circuit, and devices connecting said second component to said weight for movement with said weight; said variable resistance means being constructed to progressively decrease the resistance imposed on said brake energizing circuit as said weight is caused to be moved along said path from said normally occupied position in a predetermined proportionate response to the rate of vehicle deceleration deriving from manually initiated brake energization; said weight being mounted on said support in the manner of a pendulum and the magnitude of said weight relative to the bias of said resilient means additionally being sufficient by its response to the force of gravity in the event of the vehicle being positioned in an inclined position, as on a grade, to partially overcome the bias imposed thereon by said resilient means and move from its said normally occupied position, and said resilient means being effective to progressively increase the opposition thereof to movement of said weight in a predetermined relation to the extent of movement of said weight from said normally occupied position resulting from the inclined position of the trailer.

7. In a regulator for the electrically energized brakes of a trailer which is attached to a towing vehicle, a supporting means adapted to be fixedly mounted on the trailer, a weight, means for mounting said weight on said supporting means with capacity for limited reciprocatory movement relative to said supporting means in a substantially horizontal path which extends at least substantially longitudinally of the trailer, resilient means interposed between said supporting means and a member movable incident to said reciprocatory movement normally operative to cause said weight to occupy a predetermined position intermediate the ends of said path and forming a component part of a variable electrical resistance means interposed in an electrical circuit extending between the trailer brakes and a source of electrical energy employed for energization of the trailer brakes, said resistance means further including a stationary component and a second component electrically conductively engaging said first component and mounted for movement relative thereto with resultant variation in the resistance imposed on said brake energizing circuit, manually operable means for opening and closing said brake energizing circuit and devices connecting said second component to said weight for movement with said weight; said variable resistance means being constructed to progressively decrease the resistance imposed on said brake energizing circuit as said weight is caused to be moved along said path from said normally occupied position in a predetermined proportionate response to the rate of towing vehicle deceleration deriving from manually initiated brake actuation of that vehicle.

8. In a regulator for the electrically energized brakes of a trailer which is attached to a towing vehicle, a supporting means adapted to be fixedly mounted on the trailer, a weight, means for mounting said weight on said supporting means with capacity for limited reciprocatory movement relative to said supporting means in a substantially horizontal path which extends at least substantially longitudinally of the trailer, resilient means interposed between said supporting means and a member movable incident to said reciprocatory movement normally operative to cause said weight to occupy a predetermined position intermediate the ends of said path and forming a component part of a variable electrical resistance means interposed in an electrical circuit extending between the trailer brakes and a source of electrical energy employed for energizing the trailer brakes, said resistance means further including a stationary component and a second component electrically conductively engaging said first component and mounted for movement relative thereto with resultant variation in the resistance imposed on said brake energizing circuit, manually operable switch means accessible to the driver of the towing vehicle and devices operated thereby for opening and closing said brake energizing circuit, and devices connecting said second component to said weight for movement with said weight; said variable resistance means being so constructed to progressively decrease the resistance imposed on said brake energizing circuit as said weight is caused to be moved along said path away from said normally occupied position.

9. In a regulator for the electrically energized brakes of a trailer which is attached to a towing vehicle, a supporting means adapted to be fixedly mounted on the trailer, a weight, means for mounting said weight on said supporting means with capacity for limited reciprocatory movement relative to said supporting means in a substantially horizontal path which extends at least substantially longitudinally of the trailer, resilient means interposed between said supporting means and a member movable incident to said reciprocatory movement normally operative to cause said weight to occupy a predetermined position intermediate the ends of said path and forming a component part of a variable electrical resistance means interposed in an electrical circuit extending between the trailer brakes and a source of electrical energy employed for brake energization and including a stationary component and a second component electrically conductively engaging said first component and mounted for movement relative thereto with resultant variation in the resistance imposed on said brake energizing circuit, manually operable means for opening and closing said brake energizing circuit and devices connecting said second component to said weight for movement with said weight; said variable resistance means being constructed to progressively decrease the resistance imposed on said brake energizing circuit as said weight is caused to be moved along said path from said normally occupied position in a predetermined proportionate response to the rate of vehicle deceleration deriving from manually initiated brake energization; the magnitude of said weight being sufficient to respond to deceleration of the trailer by partially overcoming the bias imposed thereon by said resilient means and moving along said path from said normally occupied position, and said resilient means being constructed and arranged to progressively increase the opposition thereof to movement of said weight in a predetermined relation to the extent of movement of said weight from said normally occupied position.

10. In a regulator for the electrically energized brakes of a trailer which is attached to a towing vehicle, a supporting means adapted to be fixedly mounted on the trailer, a weight, means for mounting said weight on said supporting means with capacity for limited reciprocatory movement relative to said supporting means in a substantially horizontal path which extends at least substantially longitudinally of the trailer, resilient means interposed between said supporting means and a member movable incident to said reciprocatory movement normally operative to cause said weight to occupy a predetermined position intermediate the ends of said path and forming a component part of a variable electrical resistance means interposed in an electrical circuit extending between the trailer brakes and a source of electrical energy employed for energization of the trailer brakes, said resistance means further including a stationary component and a second component electrically conductively engaging said first component and mounted for movement relative thereto with resultant variation in the resistance imposed on said brake energizing circuit manually operable means for opening and closing said brake energizing circuit, and devices connecting said second component to said weight for movement with said weight; said variable resistance means being constructed to progressively decrease the resistance imposed on said brake energizing circuit as said weight is caused to be moved along said path away from said normally occupied position in a predetermined proportionate response to the rate of vehicle deceleration deriving from manually initiated brake energization of the towing vehicle; said weight being mounted on said support in the manner of a pendulum and the magnitude of said weight relative to the bias of said resilient means, additionally being sufficient by its response to the force of gravity in the event of the trailer being positioned in an inclined position, as on a grade, to partially overcome the bias imposed thereon by said resilient means and move from its said normally occupied position, and said resilient means being constructed and arranged to progressively increase the opposition thereof to movement of said weight in a predetermined relation to the extent of movement of said weight from said normally occupied position resulting from the inclined position of the trailer.

11. In a regulator for the electrically energized brakes of a trailer which is attached to a towing vehicle, a supporting means adapted to be fixedly mounted on the trailer, a weight, means for mounting said weight on said supporting means with capacity for limited reciprocatory movement relative to said supporting means in a substantially horizontal path which extends at least substantially longitudinally of the trailer, resilient means interposed between said supporting means and a member movable incident to said reciprocatory movement normally operative to cause said weight to occupy a predetermined position intermediate the ends of said path and forming a component part of a variable electrical resistance means interposed in an electrical circuit extending between the trailer brakes and a source of electrical energy employed for brake energization and including a stationary component and a second component electrically conductively engaging said first component and movable relative thereto with resultant variation in the resistance imposed on said brake energizing circuit, manually operable switch means accessible to the driver of the towing vehicle for opening and closing said brake energizing circuit, and devices connecting said second component to said weight for movement with said weight; said variable resistance means being constructed as to progressively decrease the resistance imposed on said brake energizing circuit as said weight is caused to be moved along said path from said normally occupied position in a predetermined proportionate response to the rate of vehicle deceleration deriving from manually initiated brake energization; the magnitude of said weight being sufficient to respond to deceleration of the trailer by partially overcoming the bias imposed thereon by said resilient means and moving along said path from said normally occupied position and said resilient means being constructed and arranged to progressively increase the opposition thereof to movement of said weight in a predetermined relation to the extent of movement of said weight from said normally occupied position resulting from the inclined position of the trailer.

12. In a regulator for the electrically energized brakes of a trailer which is attached to a towing vehicle, a supporting means adapted to be fixedly mounted on the trailer, a weight, means for mounting said weight on said supporting means with capacity for limited reciprocatory movement relative to said supporting means in a substantially horizontal path which extends at least substantially longitudinally of the trailer, resilient means interposed between said supporting means and a member movable incident to said reciprocatory movement normally operative to cause said weight to occupy a predetermined position intermediate the ends of said path and forming a component part of a variable electrical resistance means interposed in an electrical circuit extending between the trailer brakes and a source of electrical energy employed for brake energization and including a stationary component and a second component electrically conductively engaging said first component and mounted for movement relative thereto with resultant variation in the resistance imposed on said brake energizing circuit, manually operable switch means accessible to the driver of the towing vehicle for opening and closing said brake energizing circuit, and devices connecting said second component to said weight for movement with said weight; said variable resistance means being constructed to progressively decrease the resistance imposed on said brake energizing circuit as said weight is caused to be moved along said path from said normally occupied position; said weight being mounted on said support in the manner of a pendulum and the magnitude of said weight relative to the bias of said resilient means, additionally being sufficient by its response to the force of gravity in the event of the trailer being positioned in an inclined position, as on a grade, to partially overcome the bias imposed thereon by said yieldable means and move from its said normally occupied position, and said yieldable means being constructed and arranged to progressively increase the opposition thereof to movement of said weight in a predetermined relation to the extent of movement thereof from said normally occupied position resulting from the inclined position of the trailer.

13. In a regulator for the electrically energized brakes of a trailer which is attached to a towing vehicle including manual means for initiating brake energization; said regulator including a frame member, means for mounting said frame member on a trailer, a pendulum-like weight suspended from said frame member for limited oscillatory movement relative to said frame member in a substantially horizontal path extending substantially longitudinally of the trailer, and a variable electrical resistance means interposed in a circuit connecting the trailer brakes with a source of electrical energy employed for brake energization and including a stationary contact component carried by said frame member and a variable resistance component movable with said weight and including resilient contact means engaging said stationary component; said contact means of said variable resistance component additionally normally resiliently causing said weight to occupy a predetermined position intermediate the ends of its said path; said variable resistance means being constructed to progressively decrease the electrical resistance imposed on said brake energizing circuit as said weight is moved along said path from said normally occupied position in a predetermined proportionate response to the rate of vehicle deceleration deriving from manually initiated brake energization.

14. In a regulator for the electrically energized brakes of a trailer which is attached to a towing vehicle including manual means for initiating brake energization; said regulator including a frame member, means for mounting said frame member on a trailer, a pendulum-like weight suspended from said frame member for limited oscillatory movement relative to said frame member in a substantially horizontal path extending substantially longitudinally of the trailer, and a variable electrical resistance means interposed in a circuit connecting the trailer brakes with a source of electrical energy employed for brake energization and including a stationary contact component carried by said frame member and a variable resistance component movable with said weight and including resilient contact means engaging said stationary contact component; said contact means of said variable resistance component additionally normally resiliently causing said weight to occupy a predetermined position intermediate the ends of its said path; said variable resistance means being constructed and arranged to progressively decrease the electrical resistance imposed on said brake energizing circuit as said weight is moved along said path from said normally occupied position in a predetermined proportionate response to the rate of vehicle deceleration deriving from manually initiated brake energization, a relay for opening and closing said brake energizing circuit, and relay operating means connected to the braking system of the towing vehicle.

15. In a regulator for the electrically energized brakes of a trailer which is attached to a towing vehicle including manual means for initiating brake energization; said regulator including a frame member, means for mounting said frame member on a trailer, a pendulum-like weight suspended from said frame member for limited oscillatory movement relative to said frame member in a substantially horizontal path extending substantially longitudinally of the trailer, and a variable electrical resistance means interposed in a circuit connecting the trailer brakes with a source of electrical energy employed for brake energization and including a stationary contact component carried by said frame member and a variable resistance component movable with said weight and including resilient contact means engaging said stationary contact component; said contact means of said variable resistance component additionally normally resiliently causing said weight to occupy a predetermined position intermediate the ends of its said path; said variable resistance means being arranged to progressively decrease the electrical resistance imposed on said brake energizing circuit as said weight is moved along said path from said normally occupied position in a predetermined proportionate response to the rate of vehicle deceleration deriving from manually initiated brake energization; the magnitude of said weight being sufficient in response to deceleration of the trailer to momentarily partially overcome the bias of said resilient contact means of said variable resistance component with resultant momentary movement from said normally occupied position and said resilient contact means being constructed and arranged to progressively increase the opposition thereof to movement of said weight in a predetermined relation to the extent of movement thereof from said normally occupied position.

16. In a regulator for the electrically energized brakes of a trailer which is attached to a towing vehicle; said regulator including a frame member, means for mounting said frame member on a trailer, a pendulum-like weight suspended from said frame member for limited oscillatory movement relative to said frame member in a substantially horizontal path extending substantially longitudinally of the trailer, a variable electrical resistance means interposed in a circuit connecting the trailer brakes with a source of electrical energy employed for brake energization and including a stationary contact component carried by said frame member, a variable resistance component movable with said weight and including resilient contact means engaging said stationary contact component; said contact means of said variable resistance component additionally normally resiliently causing said weight to occupy a predetermined position intermediate the ends of its said path; said variable resistance means being arranged to progressively decrease the electrical resistance imposed on said brake energizing circuit as said weight is moved along said path from said normally occupied position in a predetermined proportionate response to the rate of vehicle deceleration deriving from manually initiated brake energization; a relay for opening and closing said brake energizing circuit, and relay operating means connected to the braking system of the towing vehicle; the magnitude of said weight being sufficient in response to deceleration of the trailer to momentarily partially overcome the bias of said resilient contact means of said variable resistance component with resultant momentary movement from said normally occupied position and said resilient contact means being constructed and arranged to progressively increase the opposition thereof to movement of said weight in a predetermined relation to the extent of movement thereof from said normally occupied position.

17. In a regulator for the electrically energized brakes of a trailer which is attached to a towing vehicle including manual means for initiating brake energization; said regulator including a frame member, means for mounting said frame member on a trailer, a pendulum-like weight suspended from said frame member for limited oscillatory movement relative to said frame member in a substantially horizontal path extending substantially longitudinally of the trailer, and a variable electrical resistance means interposed in a circuit connecting the trailer brakes with a source of electrical energy employed for brake energization and including a stationary contact component carried by said frame member and a variable resistance component movable with said weight and including resilient contact means engaging said stationary contact component; said contact means of said variable resistance component additionally normally resiliently causing said weight to occupy a predetermined position intermediate the ends of its said path; said variable resistance means being arranged to progressively decrease the electrical resistance imposed on said brake energizing circuit as said weight is moved along said path from said normally occupied position; the magnitude of said weight relative to the bias of said resilient means being sufficient by its response to the force of gravity in the event of the trailer being inclined, as when descending a grade, to partially overcome the bias imposed thereon by said resilient contact means of said variable resistance component by compensatory movement from its said normally occupied position and said resilient contact means being constructed and arranged to progressively increase the opposition thereof to movement of said weight in a predetermined relation to the extent of movement of said weight from said normally occupied position resulting from the inclined position of the trailer.

18. In a regulator for the electrically energized brakes of a trailer which is attached to the towing vehicle; said regulator including a frame member, means for mounting said frame member on a trailer, a pendulum-like weight suspended from said frame member for limited oscillatory movement relative to said frame member in a substantially horizontal path extending substantially longitudinally of the trailer, a variable electrical resistance means interposed in a circuit connecting the trailer brakes with a source of electrical energy employed for brake energization and including a stationary contact component carried by said frame member and a variable resistance component movable with said weight and including resilient contact means engaging said stationary contact component; said contact means of said variable resistance component additionally normally resiliently causing said weight to occupy a predetermined position intermediate the ends of its said path; said variable resistance means being arranged to progressively decrease the resistance imposed on said brake energizing circuit as said weight is moved along said path from said normally occupied position, a relay for opening and closing said brake energizing circuit, and relay operating means connected to the braking system of the towing vehicle; the magnitude of said weight relative to the bias of said resilient means, being sufficient by its response to the force of gravity in the event of the trailer being inclined, as when descending a grade, to partially overcome the bias imposed thereon by said resilient contact means of said variable resistance component by compensatory movement from its said normally occupied position and said resilient contact means being constructed and arranged to progressively increase the opposition thereof to movement of said weight in a predetermined relation to the extent of movement of said weight from said normally occupied position resulting from the inclined position of the trailer and an adjustable stop means disposed in the path of movement of a member movable with said weight operative so to engage said member as to prevent brake energizing movement of said weight other than in response to forward deceleration of the trailer or in response to the inclined position of the trailer while descending a grade; the adjustment of said stop means determining the magnitude of resistance initially imposed on said brake energizing circuit.

19. In a regulator for the electrically energized brakes of a trailer which is attached to a towing vehicle including manual means for initiating brake energization; said regulator including a frame member, means for mounting said frame member on a trailer, a pendulum-like weight suspended from said member for limited oscillatory movement relative to said frame member in a substantially horizontal path extending substantially longitudinally of the trailer, and a variable electrical resistance means interposed in a circuit connecting the trailer brakes with a source of electrical energy employed for brake energization and including a stationary contact component carried by said frame member and a variable resistance component movable with said weight and including resilient contact means engaging said stationary contact component; said contact means of said variable resistance component additionally normally resiliently causing said weight to occupy a predetermined position intermediate the ends of its said path; said variable resistance means being arranged to progressively decrease the resistance imposed on said brake energizing circuit as said weight is moved along said path from said normally occupied position in a predetermined proportionate response to the rate of vehicle deceleration deriving from manually initiated brake energization; the magnitude of said weight relative to the bias of said resilient means, additionally being sufficient by its response to the force of gravity in the event of the trailer being inclined, as when traversing a grade, to partially overcome the bias imposed thereon by said resilient contact means of said variable resistance component by compensatory movement from its said normally occupied position and said contact means being constructed and arranged to progressively increase the opposition thereof to movement of said weight in a predetermined relation to the extent of movement of said weight from said normally occupied position resulting from the inclined position of the trailer.

20. In a regulator for the electrically energized brakes of a trailer which is attached to a towing vehicle; said regulator including a frame member, means for mounting said frame member on a trailer, a pendulum-like weight suspended from said frame member for limited oscillatory movement relative to said frame member in a substantially horizontal path extending substantially longitudinally of the trailer, a variable electrical resistance means interposed in a circuit connecting the trailer brakes with a source of electrical energy employed for brake energization and including a stationary contact component carried by said frame member and a variable resistance component movable with said weight and including resilient contact means engaging said stationary contact component; said contact means of said variable resistance component additionally normally resiliently causing said weight to occupy a predetermined position intermediate the ends of its said path; said variable resistance means being arranged to progressively decrease the resistance imposed on said brake energizing circuit as said weight is moved along said path from said normally occupied position in a predetermined proportionate response to the rate of vehicle deceleration deriving from manually initiated brake energization, a relay for opening and closing said brake energizing circuit, and relay operating means connected to the braking system of the towing vehicle; the magnitude of said weight relative to the bias of said resilient means, additionally being sufficient by its response to the force of gravity in the event of the trailer being inclined, as when descending a grade, to partially overcome the bias imposed thereon by said resilient contact means of said variable resistance component by compensatory movement from its said normally occupied position and said resilient contact means being constructed and arranged to progressively increase the opposition thereof to movement of said weight in a predetermined relation to the extent of movement of said weight from said normally occupied position resulting from the inclined position of the trailer, and an adjustable stop means disposed in a path of movement of a member movable with said weight operative so to engage said member as to prevent brake energizing movement of said weight other than in response to forward deceleration of the trailer or in response to the inclined position of the trailer while descending a grade; the adjustment of said stop means serving to determine the magnitude of resistance initially imposed on said brake energizing circuit.

References Cited in the file of this patent
UNITED STATES PATENTS

| | | |
|---|---|---|
| 1,952,679 | Leveen | Mar. 27, 1934 |
| 2,407,510 | Octzel | Sept. 10, 1946 |
| 2,452,033 | Born | Oct. 26, 1948 |
| 2,625,243 | Jones et al. | Jan. 13, 1953 |
| 2,642,961 | Teal | June 23, 1953 |
| 2,779,443 | Tucker | Jan. 29, 1957 |
| 2,856,036 | Mullen | Oct. 14, 1958 |
| 2,870,876 | Pease | Jan. 27, 1959 |

FOREIGN PATENTS

| | | |
|---|---|---|
| 439,728 | Germany | Dec. 16, 1925 |